United States Patent
Ishii

(10) Patent No.: US 11,041,564 B2
(45) Date of Patent: Jun. 22, 2021

(54) CONTROL APPARATUS FOR CONTINUOUSLY VARIABLE TRANSMISSION

(71) Applicant: SUBARU CORPORATION, Tokyo (JP)

(72) Inventor: Yusaku Ishii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/707,743

(22) Filed: Dec. 9, 2019

(65) Prior Publication Data
US 2020/0256463 A1    Aug. 13, 2020

(30) Foreign Application Priority Data

Feb. 13, 2019   (JP) .............................. JP2019-023476

(51) Int. Cl.
| F16H 61/662 | (2006.01) |
| F16H 61/02 | (2006.01) |
| F16H 61/00 | (2006.01) |
| F16H 9/00 | (2006.01) |
| F16H 59/70 | (2006.01) |
| F16H 9/12 | (2006.01) |

(52) U.S. Cl.
CPC ....... *F16H 61/662* (2013.01); *F16H 61/0202* (2013.01); *F16H 61/66236* (2013.01); *F16H 9/12* (2013.01)

(58) Field of Classification Search
CPC .............. F16H 61/662; F16H 61/0202; F16H 61/66236; F16H 9/12; F16H 2061/0087; F16H 2061/66277; F16H 2059/704
See application file for complete search history.

(56) References Cited

U.S. PATENT DOCUMENTS

| 2009/0082172 A1* | 3/2009 | Mori ................. F16H 61/66272 477/46 |
| 2017/0321802 A1* | 11/2017 | Takahashi ........... F16H 61/0202 |
| 2018/0355969 A1* | 12/2018 | Kawamoto ....... F16H 61/66272 |

FOREIGN PATENT DOCUMENTS

| JP | 2001-208183 A | 8/2001 |
| KR | 20170069362 A * | 6/2017 ............. F16H 61/66 |

OTHER PUBLICATIONS

Machine translation of KR20170069362 filed Jan. 27, 2021 (Year: 2021).*

\* cited by examiner

*Primary Examiner* — Tisha D Lewis
(74) *Attorney, Agent, or Firm* — Troutman Pepper Hamilton Sanders LLP

(57) ABSTRACT

A control apparatus for a continuously variable transmission includes a primary-pulley clamping force acquiring unit that acquires a clamping force of a primary pulley, a secondary-pulley clamping force acquiring unit that acquires a clamping force of a secondary pulley, an input torque acquiring unit that acquires a torque applied to the primary pulley, a transmission ratio acquiring unit that acquires a transmission ratio, a learning value acquiring unit, and a controller. When a learning condition is satisfied, the learning value acquiring unit decreases the clamping force of the secondary pulley while the transmission ratio and the input torque are kept substantially constant, and acquires, as a learning value, the clamping force of the secondary pulley at which a clamping force ratio is maximum. The controller adjusts a target clamping force of the secondary pulley on the basis of the learning value.

17 Claims, 6 Drawing Sheets

LEARNING CORRECTION COEFFICIENT
(LEARNING VALUE) TABLE

| TRANSMISSION RATIO (Hi ↕ Lo) | LEARNING CORRECTION COEFFICIENT |
|---|---|
| | . |
| | . |
| | . |

FIG. 3

NECESSARY SECONDARY-PULLEY CLAMPING FORCE MAP

| | INPUT TORQUE (Nm) | |
|---|---|---|
| | ⇐ Lo | Hi ⇒ |
| TRANSMISSION RATIO ↑ Hi / Lo ↓ | NECESSARY SECONDARY-PULLEY CLAMPING FORCE | |

FIG. 4

CONTROL APPARATUS FOR CONTINUOUSLY VARIABLE TRANSMISSION

CROSS-REFERENCE TO RELATED APPLICATIONS

The present application claims priority from Japanese Patent Application No. 2019-023476 filed on Feb. 13, 2019, the entire contents of which are hereby incorporated by reference.

BACKGROUND

The disclosure relates to a control apparatus for a continuously variable transmission, in particular, to a control apparatus that controls a clamping force of a variator of a continuously variable transmission.

A chain-driven continuously variable transmissions (CVT), a belt-driven CVT, or a CVT of another type has been widely put into practical use as an automatic transmission of a vehicle that steplessly varies a transmission ratio without causing transmission shock while improving fuel efficiency. For example, a chain-driven continuously variable transmission includes a primary pulley (drive pulley) disposed on an input shaft, a secondary pulley (driven pulley) disposed on an output shaft, and a power transmission element such as a chain wound around the primary pulley and the secondary pulley. An engine torque generated by an engine is transmitted from the primary pulley to the secondary pulley via the power transmission element or the chain. The continuously variable transmission steplessly varies a transmission ratio by changing the groove width of each of the pulleys and thereby changing the winding diameter of the power transmission element. Reference is made to Japanese Unexamined Patent Application Publication (JP-A) No. 2001-208183, for example.

SUMMARY

An aspect of the technology provides a control apparatus for a continuously variable transmission. The control apparatus includes a primary-pulley clamping force acquiring unit, a secondary-pulley clamping force acquiring unit, an input torque acquiring unit, a transmission ratio acquiring unit, a learning value acquiring unit, and a controller. The primary-pulley clamping force acquiring unit is configured to acquire a clamping force of a primary pulley. The secondary-pulley clamping force acquiring unit is configured to acquire a clamping force of a secondary pulley. The input torque acquiring unit is configured to acquire an input torque applied to the primary pulley. The transmission ratio acquiring unit is configured to acquire a transmission ratio. When a predetermined learning condition is satisfied, the learning value acquiring unit is configured to decrease the clamping force of the secondary pulley while the transmission ratio and the input torque are kept substantially constant, and to conduct learning to acquire, as a learning value, the clamping force of the secondary pulley at which a clamping force ratio of the clamping force of the primary pulley to the clamping force of the secondary pulley is maximum. The controller is configured to adjust a target clamping force of the secondary pulley on the basis of the learning value acquired by the learning value acquiring unit. The target clamping force is used to control the clamping force of the secondary pulley.

An aspect of the technology provides a control apparatus for a continuously variable transmission. The control apparatus includes circuitry configured to: acquire a clamping force of a primary pulley; acquire a clamping force of a secondary pulley; acquire an input torque applied to the primary pulley; acquire a transmission ratio; decrease, when a predetermined learning condition is satisfied, the clamping force of the secondary pulley while the transmission ratio and the input torque are kept substantially constant, and conduct learning to acquire, as a learning value, the clamping force of the secondary pulley at which a clamping force ratio of the clamping force of the primary pulley to the clamping force of the secondary pulley is maximum; and adjust a target clamping force of the secondary pulley on the basis of the acquired learning value by the learning value acquiring unit. The target clamping force is used to control the clamping force of the secondary pulley.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 3 is a table illustrating an example of a learning correction coefficient (learning value).

FIG. 4 is an example map illustrating a necessary clamping force of a secondary pulley.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
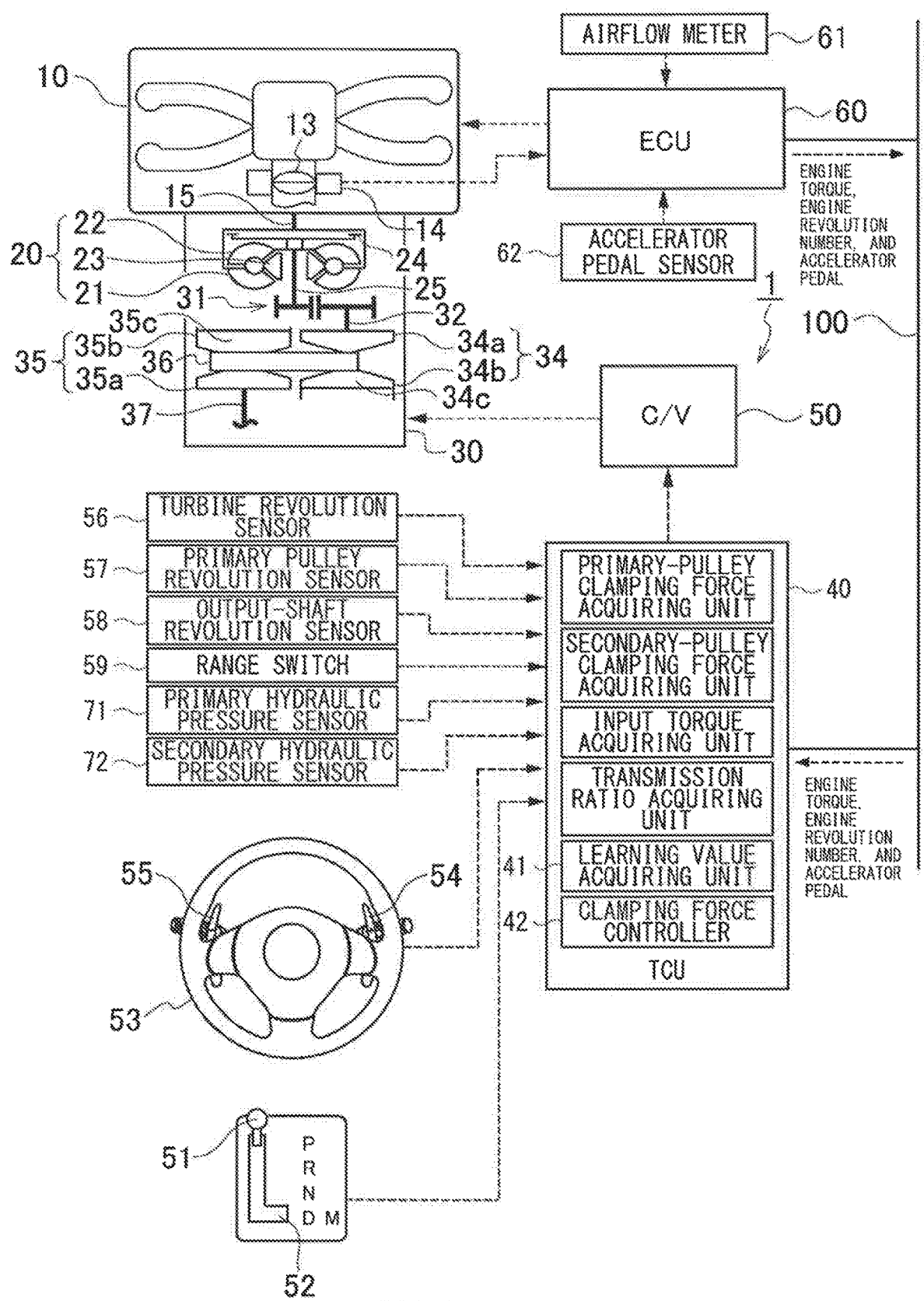
FIG. 1 is a block diagram illustrating an example configuration of a control apparatus for a continuously variable transmission according to one embodiment of the technology.

First, an example configuration of the control apparatus 1, according to an embodiment of the technology, of a continuously variable transmission 30 is described with reference to FIG. 1. FIG. 1 is a block diagram of the configuration of the control apparatus 1 of the continuously variable transmission 30 and the configurations of the continuously variable transmission 30 and the other components to which the control apparatus 1 is applied.

An engine 10 may be of any type. For example, the engine 10 may be a flat-four gasoline engine of a cylinder injection type. The air taken into the engine 10 via a non-illustrated air cleaner may be throttled at an electronically-controlled throttle valve 13 (hereinafter simply referred to as throttle valve 13) provided in an intake pipe, pass through an intake manifold, and be taken into each of cylinders of the engine 10. The amount of the air taken via the air cleaner may be detected by an airflow meter 61. The throttle valve 13 may be provided with a throttle position sensor 14 that detects a position of the throttle valve 13. Each of the cylinders of the engine 10 may be provided with an injector that injects fuel. Additionally, each of the cylinders of the engine 10 may be provided with an ignition plug that ignites an air-fuel mixture, and an ignitor built-in coil that applies high voltage to the ignition plug. In each of the cylinders of the engine 10, a mixture of intake air and fuel injected by the injector may be ignited by the ignition plug and burned. The burned gas may be discharged through an exhaust pipe.

In addition to the airflow meter 61 and the throttle position sensor 14 described above, a cam angle sensor may be provided in the vicinity of a cam shaft of the engine 10. The cam angle sensor may discriminate the cylinders of the engine 10. Additionally, a crank angle sensor may be provided in the vicinity of a crank shaft of the engine 10. The crank angle sensor may detect a position of the crank shaft. These sensors may be coupled to an engine control unit (ECU) 60 described below. Other various sensors including an accelerator pedal sensor 62 that detects a degree of depressing of an accelerator pedal or a position of an accelerator pedal, and a water temperature sensor that detects the temperature of a cooling water for cooling the engine 10, may be coupled to the ECU 60.

The continuously variable transmission 30 may be coupled to an output shaft 15 of the engine 10 via a torque converter 20 serving as a clutch mechanism and a torque amplifying mechanism. The continuously variable transmission 30 may change the speed of the motive power of the engine 10 and output the changed speed.

The torque converter 20 may include a pump impeller 21, a turbine runner 22, and a stator 23, for example. The pump impeller 21 coupled to the output shaft 15 may generate a flow of an oil, and the turbine runner 22 opposed to the pump impeller 21 may drive the output shaft 15 using the power of the engine 10 received via the oil. The stator 23 disposed between the pump impeller 21 and the turbine runner 22 may control the flow released (returning) from the turbine runner 22 and return the rectified flow to the pump impeller 21 to increase torque.

The torque converter 20 may also include a lock-up clutch 24 that directly couples an input (i.e., the pump impeller 21) and an output (i.e., the turbine runner 22). When the lock-up clutch 24 is not engaged or in a non-lockup state, the torque converter 20 may covert the driving force of the engine 10 into torque and transmit the torque to the continuously variable transmission 30. On the other hand, when the lock-up clutch 24 is engaged or in a lock-up state, the torque converter 20 may directly transmit the driving force of the engine 10 to the continuously variable transmission 30. The number of revolutions of the turbine runner 22 (hereinafter referred to as turbine revolution number) of the torque converter 20 may be detected by a turbine revolution sensor 56. The turbine revolution number detected by the turbine revolution sensor 56 may be transmitted to a transmission control unit (TCU) 40 described below. In one embodiment, the TCU 40 may serve as a "control apparatus".

The continuously variable transmission 30 may include a primary shaft 32 and a secondary shaft 37. The primary shaft 32 may be coupled to an output shaft 25 of the torque converter 20 via a reduction gear 31 or a forward/backward travel switching mechanism. The secondary shaft 37 may be disposed in parallel to the primary shaft 32.

The primary shaft 32 may be provided with a primary pulley 34 that includes a fixed pulley 34a and a movable pulley 34b. The fixed pulley 34a may be jointed to the primary shaft 32. The movable pulley 34b may be opposed to the fixed pulley 34a and slidable along the axis of the primary shaft 32. The cone face interval or the width of a pulley groove between the fixed pulley 34a and the movable pulley 34b may be adjustable. The secondary shaft 37 may be provided with a secondary pulley 35 that includes a fixed pulley 35a and a movable pulley 35b. The fixed pulley 35a may be jointed to the secondary shaft 37. The movable pulley 35b may be opposed to the fixed pulley 35a and slidable along the axis of the secondary shaft 37. The width of a pulley groove between the fixed pulley 35a and the movable pulley 35b may be adjustable.

A chain 36 may be wound around the primary pulley 34 and the secondary pulley 35 to transmit a driving force. The width of a groove of the primary pulley 34 and the width of a groove of the secondary pulley 35 may be changed to vary the ratio of the winding diameter (i.e., pulley ratio) of the chain 36 relative to each of the pulleys 34 and 35, which steplessly varies a transmission ratio i. The transmission ratio i may be represented by the expression, I=Rs/Rp, where Rp denotes the winding diameter of the chain 36 for the primary pulley 34, and Rs denotes the winding diameter of the chain 36 for the secondary pulley 35. The transmission ratio i may also be represented by the expression, I=Np/Ns, where Np denotes the number of revolutions of the primary pulley 34, and Ns denotes the number of revolutions of the secondary pulley 35.

The movable pulley 34b of the primary pulley 34 may be provided with a hydraulic chamber (a hydraulic cylinder chamber) 34c. The movable pulley 35b of the secondary pulley 35 may be provided with a hydraulic chamber (also referred to as a hydraulic cylinder chamber) 35c. The groove widths of the primary pulley 34 and the secondary pulley 35 may be set or changed by adjusting a primary hydraulic pressure Pp of oil introduced into the hydraulic chamber 34c of the primary pulley 34 and a secondary hydraulic pressure Ps of oil introduced into the hydraulic chamber 35c of the secondary pulley 35. Note that the clamping force Fp of the primary pulley 34 may be calculated by multiplying the primary hydraulic pressure Pp by the pressure receiving area of the hydraulic chamber 34c, and the clamping force Fs of the secondary pulley 35 may be calculated by multiplying the secondary hydraulic pressure Ps by the pressure receiving area of the hydraulic chamber 35c.

The hydraulic pressure for changing the speed of the continuously variable transmission 30, i.e., the primary hydraulic pressure Pp and the secondary hydraulic pressure Ps may be controlled by a valve member (control valve) 50. The valve member 50 may regulate the hydraulic pressure of oil discharged from an oil pump by opening and closing an oil passage in the valve member 50 using a plurality of spool valves and a solenoid valve (electromagnetic valve) that operates the spool valves. The valve member 50 may supply the regulated hydraulic pressure to the hydraulic chamber 34c of the primary pulley 34 and the hydraulic chamber 35c of the secondary pulley 35. Additionally, the valve member 50 may help generate appropriate clamping forces of the primary pulley 34 and the secondary pulley 35 (hereinafter also referred to as pulley-side pressure) that prevents the chain 36 from slipping. The secondary hydraulic pressure to be supplied to the hydraulic chamber 35c of the secondary pulley 35 may be adjusted depending on a transmission torque required for the chain 36. The primary hydraulic pressure to be supplied to the hydraulic chamber 34c of the primary pulley 34 may be adjusted to a value corresponding to a target transmission ratio. The valve member 50 may also supply the hydraulic pressure to the forward/backward travel switching mechanism that switches the vehicle between traveling forward and traveling backward.

A shift lever (select lever) 51 may be provided on the floor or the center console of the vehicle, for example. The driver may operate the shift lever 51 to select or switch between an automatic transmission mode (D range) and a manual transmission mode (M range). A range switch 59 may be attached to the shift lever 51. The range switch 59 may operate in cooperation with the shift lever 51 and detect a selected position of the shift lever 51. The range switch 59 may be coupled to the TCU 40 that retrieves the selected position of the shift lever 51 detected by the range switch 59. Note that the shift lever 51 may be switchable among the D range, the M range, a parking range (P range), a reverse range (R range), and a neutral range (N range).

An M range switch 52 may be incorporated in the shift lever 51. The M range switch 52 may be turned on when the shift lever 51 is positioned on the M range side, i.e., when the manual transmission mode is selected. The M range switch 52 may be turned off when the shift lever 51 is positioned on the D range side, i.e., when the automatic transmission mode is selected. The M range switch 52 may be coupled to the TCU 40.

A plus (+) paddle switch 54 and a minus (−) paddle switch 55 may be provided on a rear side of the steering wheel 53. The plus paddle switch 54 and the minus paddle switch 55 may receive a transmission operation or a transmission request from the driver during the manual transmission mode. Hereinafter, the plus paddle switch 54 and the minus paddle switch 55 may also be collectively referred to as paddle switches 54 and 55. The plus paddle switch 54 may be used to perform manual upshifting, and the minus paddle switch 55 may be used to perform manual downshifting.

The plus paddle switch 54 and the minus paddle switch 55 may be coupled to the TCU 40. The TCU 40 may retrieve switching signals output from the paddle switches 54 and 55. Additionally, a primary pulley revolution sensor 57 and an output-shaft revolution sensor 58 may be coupled to the TCU 40. The primary pulley revolution sensor 57 may detect the number of revolutions of the primary pulley 34. The output-shaft revolution sensor 58 may detect the number of revolutions of the secondary shaft 37 (i.e., the number of revolutions of the secondary pulley 35). In one embodiment, the output-shaft revolution sensor 58 may serve as a "vehicle speed detector". Further, a primary hydraulic pressure sensor 71 and a secondary hydraulic pressure sensor 72 may be coupled to the TCU 40. The primary hydraulic pressure sensor 71 may detect the hydraulic pressure of the oil supplied to the primary pulley 34. The secondary hydraulic pressure sensor 72 may detect the hydraulic pressure of the oil supplied to the secondary pulley 35.

As described above, the continuously variable transmission 30 may be selectively switchable between two transmission modes including the automatic transmission mode and the manual transmission mode by operating the shift lever 51. The automatic transmission mode may be selected by operating the shift lever 51 to the D range. In the automatic transmission mode, the transmission ratio may be changed depending on a traveling state of the vehicle. The manual transmission mode may be selected by operating the shift lever 51 to the M range. In the manual transmission mode, the transmission ratio may be changed in accordance with driver's transmission operation on the paddle switches 54 and 55.

The TCU 40 may control the clamping force and the speed of the continuously variable transmission 30. For example, the TCU 40 may regulate the hydraulic pressure of oil to be supplied to the hydraulic chamber 34c of the primary pulley 34 and the hydraulic chamber 35c of the secondary pulley 35 by controlling the driving of the solenoid valve (electromagnetic valve) of the valve member 50 described above. The TCU 40 may thereby vary the transmission ratio and the clamping force of the continuously variable transmission 30.

The ECU 60 that comprehensively controls the engine 10 and other components may be coupled to the TCU 40 via a controller area network (CAN) 100 to establish mutual communication therebetween.

The TCU 40 and the ECU 60 may each include a microprocessor performing mathematical operations, an electrically erasable programmable read-only memory (EEPROM) holding programs that cause the microprocessor to execute various processes, a random access memory (RAM) holding various pieces of data including results of the mathematical operations, a battery-backup RAM, and an input/output interface, for example.

The ECU 60 may specify a cylinder on the basis of an output from the cam angle sensor and determine the number of revolution of the engine on the basis of a change in rotational position of the crank shaft detected from the output from the crank angle sensor. Additionally, the ECU 60 may acquire various pieces of data including data on an intake air mass, data on an accelerator pedal position, data on the air-fuel ratio of an air-fuel mixture, and data on a water temperature, on the basis of detection signals received from the various sensors described above. Additionally, the ECU 60 may calculate the engine torque of the engine 10 on the basis of the number of revolutions of the engine 10 and the intake air mass, for example. For instance, the engine torque of the engine 10 may be retrieved from an engine torque map preliminarily stored and defining a relationship among the number of revolutions of the engine, the intake air mass, and the engine torque. The ECU 60 may comprehensively control the engine 10 by controlling the amount of fuel injection, an ignition timing, and various devices on the basis of the various pieces of data acquired. The ECU 60 may transmit the data on, for example, the number of revolutions of the engine, the data on the accelerator pedal position, and the data on the engine torque to the TCU 40 via the CAN 100.

The TCU includes a primary-pulley clamping force acquiring unit, a secondary-pulley clamping force acquiring unit, an input torque acquiring unit, and a transmission ratio acquiring unit. The primary-pulley clamping force acquiring unit acquires a clamping force of the primary pulley 34. The secondary pulley clamping force acquiring unit acquires a clamping force of the secondary pulley 35. The input torque acquiring unit acquires an input torque applied to the primary pulley 34. The transmission ratio acquiring unit acquires a transmission ratio. The TCU 40 may receive, from the ECU 60, various pieces of data including data on the number of revolutions, data on the accelerator pedal position, and data on the engine torque or input torque of the variator. The TCU 40 may also receive, via the CAN 100, a vehicle speed detected by a drive wheel speed sensor, for example.

The TCU 40 may adjust the clamping force or pulley-side pressure on the basis of the engine torque of the engine 10 received from the ECU 60 via the CAN 100. For example, the TCU 40 may decrease the clamping force or hydraulic pressure of the variator as much as possible in a range not causing the chain 36 to slip in accordance with the individual variance and aged deterioration of the continuously variable transmission 30. To this end, the TCU 40 includes a learning value acquiring unit 41 and a clamping force controller 42. The learning value acquiring unit 41 and the clamping force controller 42 may each include a storage, such as an EEPROM, and a calculation unit, such as a microprocessor.

The learning value acquiring unit 41 may determine that a learning condition is satisfied on a condition that: the vehicle speed is a predetermined speed or greater; the vehicle speed is changing within a predetermined range or is substantially constant; and the input torque is changing within a predetermined range or is substantially constant (e.g., while the vehicle is traveling on a flat straight road at a constant speed). When determining that the predetermined learning condition is satisfied, the learning value acquiring unit 41 gradually decreases the clamping force Fs or hydraulic pressure of the secondary pulley 35 while the transmission ratio and the input torque are kept substantially constant or fixed. The learning value acquiring unit 41 then acquires, as a learning value, a clamping force Fs' of the secondary pulley 35 at which the ratio of the clamping force Fp of the primary pulley 34 to the clamping force Fs of the secondary pulley 35 (Fp/Fs) is maximum, i.e., at which a variation gradient of the clamping force ratio represented by d(Fp/Fs)/dFs changes from positive to negative. In one embodiment, the learning value acquiring unit 41 may serve as a "learning value acquiring unit". Note that the clamping force Fp of the primary pulley 34 may be calculated by multiplying the primary hydraulic pressure Pp by the pressure receiving area of the hydraulic chamber 34c, and the clamping force Fs of the secondary pulley 35 may be calculated by multiplying the secondary hydraulic pressure Ps by the pressure receiving area of the hydraulic chamber 35c.

Figure 2:
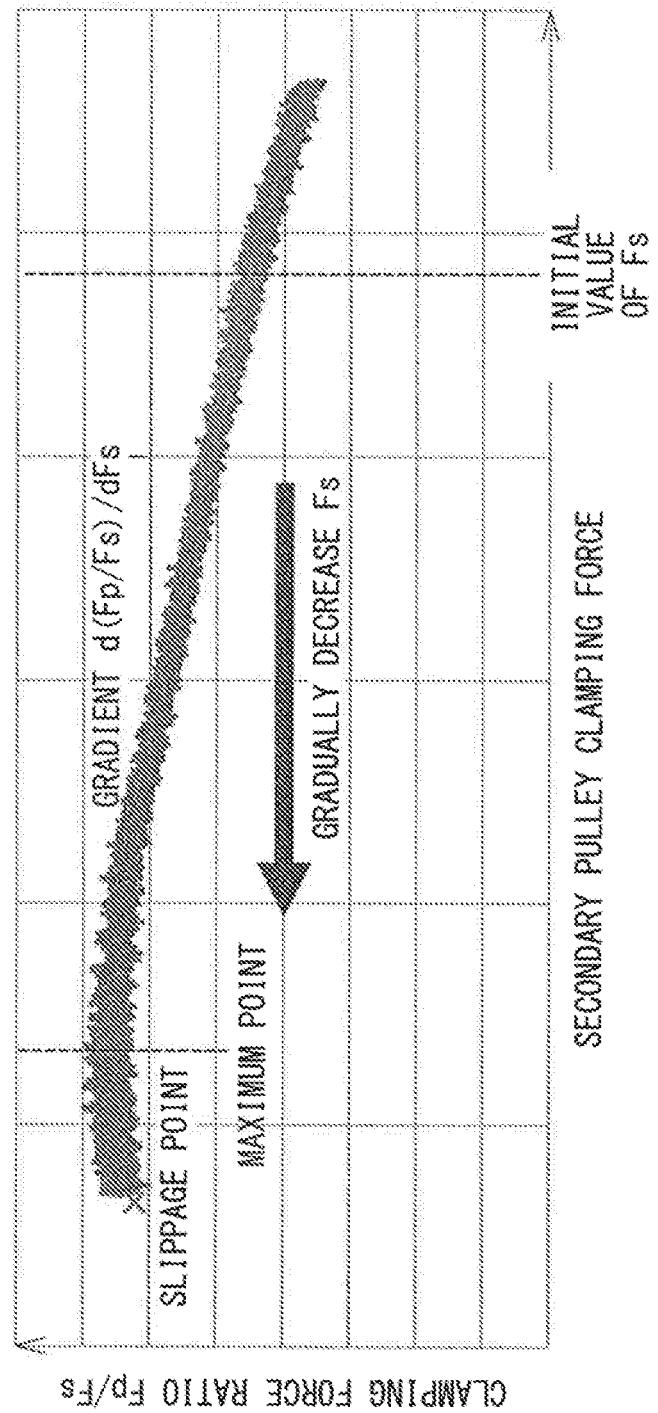
FIG. 2 is a diagram illustrating an example of a clamping force ratio characteristic of the continuously variable transmission.

FIG. 2 is a graph illustrating an example characteristic of a clamping force ratio of the continuously variable transmission 30. The graph in FIG. 2 has a horizontal axis representing the clamping force Fs of the secondary pulley 35 and a vertical axis representing a clamping force ratio Fp/Fs. As illustrated in FIG. 2, as the clamping force Fs of the secondary pulley 35 is decreased while the input torque is kept constant and the transmission ratio is kept fixed, the clamping force ratio Fp/Fs may become maximum and then begin decreasing to a slippage point indicated by x in FIG. 2. The learning value acquiring unit 41 may acquire, as a learning value Fs', the clamping force Fs' of the secondary pulley 35 at which the clamping force ratio Fp/Fs is maximum. Additionally, the learning value acquiring unit 41 may acquire, as a learning correction coefficient C, the ratio of the default (initial setting) value of the clamping force Fs of the secondary pulley 35 to the learning value Fs' (initial value Fs/learning value Fs').

The learning value acquiring unit 41 may conduct the learning described above for each transmission ratio to acquire a learning value for each transmission ratio. The learning value acquiring unit 41 may then calculate the learning correction coefficient C, which is the ratio of the default (initial setting) value of the clamping force Fs of the secondary pulley 35 to the learning value Fs', and store the learning correction coefficient C in a learning correction coefficient table. FIG. 3 illustrates an example of the learning correction coefficient (learning value) table. FIG. 3 has a vertical axis representing the transmission ratio i. The learning correction coefficient (learning value) table may contain the learning correction coefficient C for each transmission ratio i indicated by a grid point.

The learning value acquiring unit 41 may periodically repeat the learning described above to cope with aged deterioration of the continuously variable transmission 30. The learning value acquiring unit 41 may periodically acquire the learning value Fs', calculate the learning correction coefficient C, and update the learning correction coefficient table.

When the variation gradient of the clamping force ratio represented by d(Fp/Fs)/dFs is negative upon start of the learning, the learning value acquiring unit 41 may temporarily stop the learning to prevent the variator from slipping (i.e., prevent the clamping force Fs of the secondary pulley 35 from reaching the slippage point). Thereafter, the learning value acquiring unit 41 may increase the clamping force Fs of the secondary pulley 35 to a predetermined value (e.g., a value obtained by adding a margin to the initial value of the clamping force Fs of the secondary pulley 35) and then restart the learning (i.e., gradually decreasing the clamping force Fs of the secondary pulley 35).

The clamping force controller 42 may adjust the clamping force on the basis of the input torque so as not to cause the slippage of the chain 36. To this end, the clamping force controller 42 may adjust or correct a target clamping force of the secondary pulley 35 on the basis of the learning value (learning correction coefficient C) acquired. In one embodiment, the clamping force controller 42 may serve as a "controller". For example, the clamping force controller 42 may calculate a target clamping force Fs of the secondary pulley 35 by the following Expression 1:

$$\text{Target } Fs = \text{Necessary } Fs \times \text{Learning Correction Coefficient } C \times \text{Safety Margin } S \qquad \text{Expression 1}$$

where "Necessary Fs" denotes a necessary clamping force Fs of the secondary pulley 35 that is determined in accordance with the transmission ratio i and the input torque Tin, and "Learning Correction Coefficient C" denotes the ratio of the default (initial setting) value of the clamping force of the secondary pulley 35 to the learning value Fs'.

Described below is an example of how to acquire the necessary clamping force Fs of the secondary pulley 35. A necessary secondary-pulley clamping force map defining the relationship among a transmission ratio i, an input torque Tin, and a necessary clamping force Fs of the secondary pulley 35 may be stored in, for example, the EEPROM of the TCU 40. The necessary secondary-pulley clamping force map may be searched for a necessary clamping force Fs of the secondary pulley 35 on the basis of the transmission ratio i and the input torque Tin to retrieve the necessary clamping force Fs of the secondary pulley 35.

FIG. 4 illustrates an example of the necessary secondary-pulley clamping force map. FIG. 4 has a horizontal axis representing an input torque Tin (Nm) and a vertical axis representing a transmission ratio i. In the necessary secondary-pulley clamping force map, data on a necessary clamping force of the secondary pulley may be assigned to each combination (indicated by a grid point) of the transmission ratio i and the input torque Tin.

The learning correction coefficient table descried above may be stored in, for example, the EEPROM in the TCU 40. The learning correction coefficient table may be searched for the learning correction coefficient C on the basis of the transmission ratio i to retrieve the learning correction coefficient C. The safety margin S described above may be set to a minimum value.

The clamping force controller 42 may adjust the clamping force of the continuously variable transmission 30 or the pulley-side pressure by controlling the driving of the valve member 50 so that the target clamping force Fs of the secondary pulley 35 coincides with the actual clamping force of the secondary pulley 35. This prevents the clamping force of the continuously variable transmission 30 from becoming excessively large while preventing the chain 36 from slipping.

Figure 5:
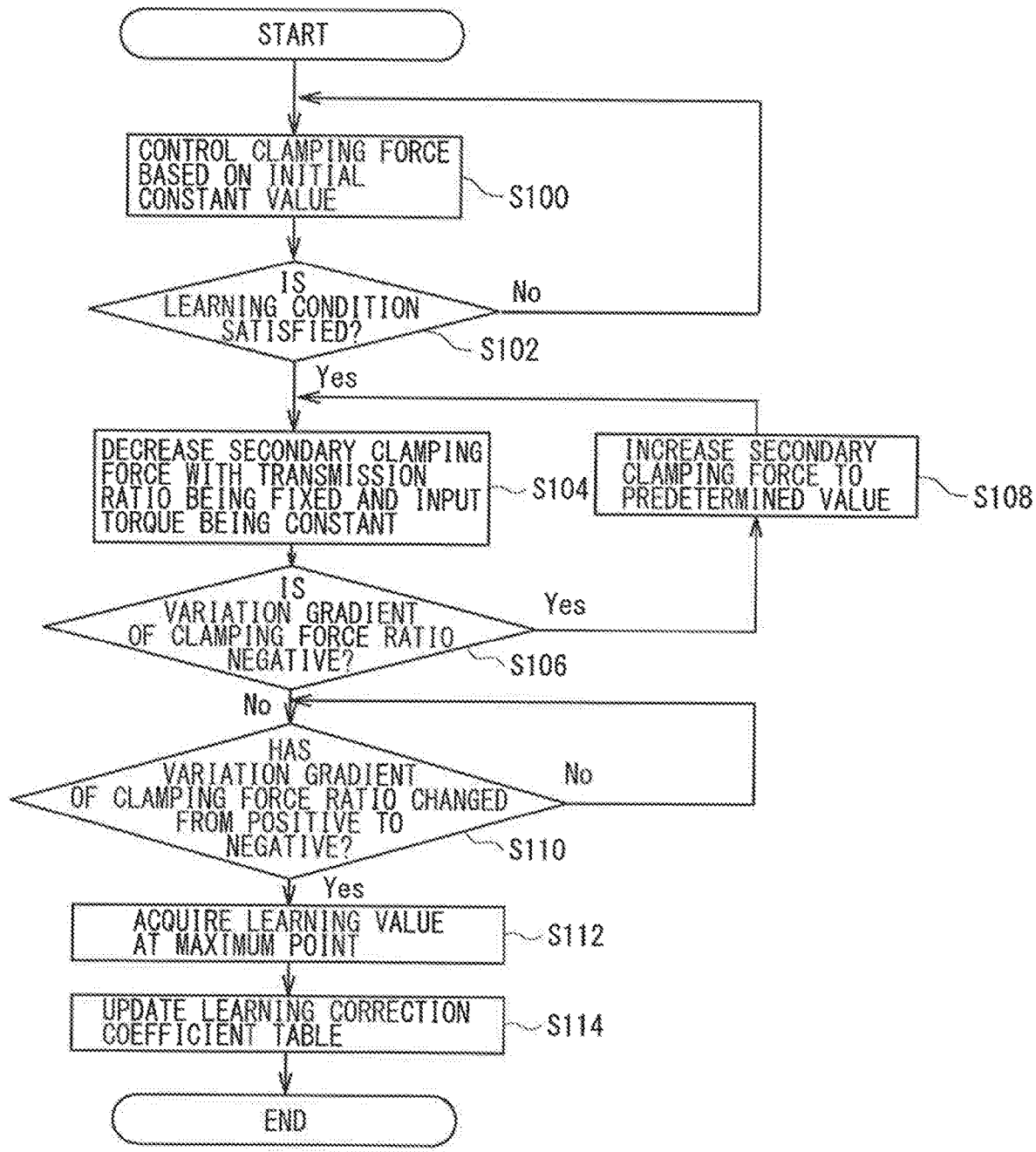
FIG. 5 is a flowchart illustrating an example procedure for learning a clamping force executed by the control apparatus for the continuously variable transmission according to one embodiment of the technology.
Figure 6:
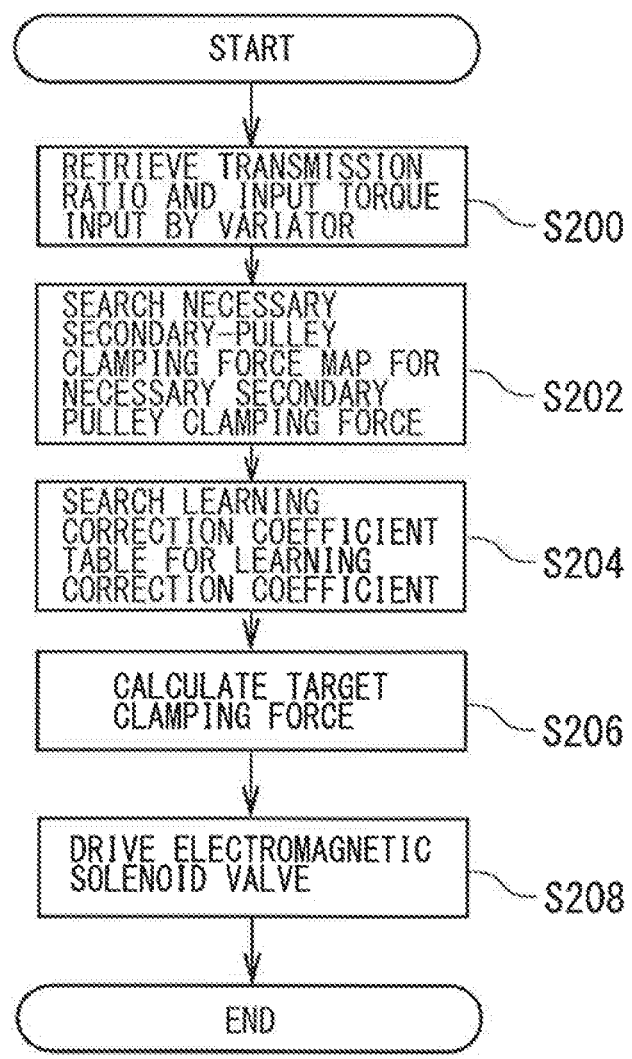
FIG. 6 is a flowchart illustrating an example procedure for setting a target clamping force executed by the control apparatus for the continuously variable transmission according to one embodiment of the technology.

Example operation of the control apparatus 1 of the continuously variable transmission 30 will now be described with reference to FIGS. 5 and 6. FIG. 5 is a flowchart illustrating an example process of learning a clamping force that is executed by the control apparatus 1 of the continuously variable transmission 30. FIG. 6 is a flowchart illustrating an example process of setting a target clamping force by the control apparatus 1 of the continuously variable transmission 30. These processes may be repeated in the TCU 40 every predetermined period of time (e.g., every ten milliseconds).

First, the process of learning a clamping force executed by the control apparatus 1 of the continuously variable transmission 30 is described with reference to FIG. 5. In Step S100 before learning, the clamping force may be controlled on the basis of a necessary clamping force of the variator that is determined from the initial setting value or default value.

In Step S102, a determination may be made as to whether the clamping force learning condition is satisfied. When the clamping force learning condition is not satisfied (Step S102: NO), the process may return to Step S100 in which the clamping force is controlled on the basis of the necessary clamping force of the variator determined from the initial setting value or default value. On the other hand, when the clamping force learning condition is satisfied (Step S102: YES), the process may proceed to Step S104.

In Step S104, the clamping force Fs of the secondary pulley 35 may be gradually decreased while the transmission ratio i is kept fixed and the input torque Tin is kept constant. Next, in Step S106, a determination may be made as to whether the variation gradient of the clamping force ratio (d(Fp/Fs)/dFs) is negative. When the variation gradient of the clamping force ratio is negative (Step S106: YES), the process may proceed to Step S108 in which the clamping force of the secondary pulley may be increased to a value obtained by adding a margin to the initial setting value of the clamping force of the secondary pulley 35. Thereafter, the process may return to Step S104 and then proceed to Step S106 again. When the variation gradient of the clamping force ratio is not negative, i.e., when the variation gradient of the clamping force ratio is positive (Step S106: NO), the process may proceed to Step S110.

In Step S110, a determination may be made as to whether the variation gradient of the clamping force ratio has changed from positive to negative. When the variation gradient of the clamping force ratio has not changed from positive to negative (Step S110: NO), the clamping force Fs of the secondary pulley 35 may be gradually decreased until the variation gradient of the clamping force ratio changes from positive to negative. On the other hand, when the variation gradient of the clamping force ratio has changed from positive to negative (Step S110: YES), the process may proceed to Step S112.

In the Step S112, the clamping force Fs' of the secondary pulley 35 at the maximum point of the clamping force ratio may be acquired as a learning value Fs'. Next, in Step S114, the learning correction coefficient C (initial value of Fs/learning value Fs') may be obtained, and the learning correction coefficient table described above may be updated. Thereafter, the process may end once.

Next, a process for setting the target clamping force that is executed by the control apparatus 1 of the continuously variable transmission 30 will be described with reference to FIG. 6. First, in Step S200, a transmission ratio i and an input torque Tin input by the variator may be retrieved. Next, in Step S202, the necessary secondary-pulley clamping force map may be searched using the transmission ratio i and the variator input torque Tin to acquire the necessary secondary-pulley clamping force.

In the subsequent Step S204, the learning correction coefficient table may be searched using the transmission ratio I to acquire the learning correction coefficient C. Thereafter, in Step S206, the target clamping force of the secondary pulley 35 may be obtained by using Expression 1 described above. Since how to obtain the target clamping force of the secondary pulley 35 may be as described above, detailed description thereof is omitted.

Thereafter, in Step S208, the electromagnetic solenoid valve of the valve member 50 and the like may be driven so that the target clamping force of the secondary pulley 35 coincides with the actual clamping force of the secondary pulley 35. Thereafter, the process may end once.

According to at least one of the foregoing embodiments as described above in detail, when the predetermined learning condition is satisfied, the clamping force of the secondary pulley is gradually decreased while the transmission ratio and the input torque are kept substantially constant. The clamping force of the secondary pulley at which the clamping force ratio of the clamping force of the primary pulley to the clamping force of the secondary pulley is maximum may be acquired as a learning value. The target clamping force of the secondary pulley may be adjusted or corrected on the basis of the acquired learning value. That is, the clamping force of the secondary pulley when the clamping force ratio takes the maximum value may be detected and learned to learn the clamping force (hydraulic pressure) of the secondary pulley immediately before an actual slippage occurs. The target clamping force of the secondary pulley may be adjusted on the basis of the learning value. This allows the clamping force (hydraulic pressure) of the secondary pulley to decrease to a maximum extent that does not cause a slippage of the chain. In other words, it is possible to reduce an excess margin. As a result, it is possible to decrease the clamping force of the variator as much as possible within a range not causing a slippage of the chain 36.

According to at least one of the foregoing embodiments, the predetermined learning condition may be determined as being satisfied on a condition that: the vehicle speed is a predetermined speed or greater; the vehicle speed is changing within a predetermined range (i.e., substantially constant); and the input torque is changing within a predetermined range (i.e., substantially constant). This allows the learning to be performed while changing the clamping force of the secondary pulley in a relatively stable traveling state.

According to at least one of the foregoing embodiments, the learning may be performed for each transmission ratio to acquire a learning value for each transmission ratio. Therefore, it is possible to acquire and store a learning value for each transmission ratio. Further, it is possible to reflect the learning value in the calculation of a target clamping force (hydraulic pressure) of the secondary pulley for each transmission ratio.

According to at least one of the foregoing embodiments, the learning may be repeated periodically to acquire a learning value periodically. This copes with individual aged deterioration of the continuously variable transmission and secures robustness of the continuously variable transmission against slip.

According to at least one of the foregoing embodiments, the target clamping force of the secondary pulley may be calculated by multiplying the necessary secondary-pulley clamping force that is set on the basis of the transmission ratio and the input torque by the learning correction coefficient that is the ratio of the default (initial setting) value of the clamping force of the secondary pulley to the learning value. Therefore, it is possible to appropriately reflect the learning value in the target clamping force (hydraulic pressure) of the secondary pulley.

According to at least one of the foregoing embodiments, when the variation gradient of the clamping force ratio is negative at the start of learning, the clamping force of the secondary pulley may be increased to a predetermined value and then gradually decreased. When the variation gradient of the clamping force ratio is negative at the start of the learning, it may be assumed that the clamping force ratio has already exceeded the maximum value. If the clamping force (hydraulic pressure) of the secondary pulley is decreased as it is, the chain 36 can slip. Therefore, according to at least one of the foregoing embodiments, the clamping force of the secondary pulley may be increased to a predetermined value to prevent the chain 36 from slipping. This results in protection of the variator.

JP-A No. 2001-208183 discloses that a clamping force imparted to each of the primary pulley and the secondary pulley (pulley-side pressure) is controlled in accordance with the engine torque transmitted via a chain or another power transmission element. At this time, if the clamping force (or a line pressure that eventually serves as the clamping force) is insufficient, the chain or the other transmission element can slip from the pulleys. This hinders the power transmission and results in decreased durability of the chain. To avoid such inconveniences including slippage of a chain, the clamping force or holding force of the primary pulley and the secondary pulley of the variator may be controlled with a margin. The margin is determined in consideration of aged deterioration and individual variance of the transmission. In other words, the margin is determined assuming the worst-case scenario.

The degree of the aged deterioration and the degree of the individual variance, however, are different among on transmissions. A larger margin can lead to excessively high hydraulic pressure for generating a necessary clamping force, which increases loss in the transmission and lowers fuel efficiency. Accordingly, there is a demand to decrease the clamping force (or the hydraulic pressure for generating the clamping force) of the variator as much as possible within a range not causing slippage of a power transmission element such as a chain.

It is desirable to provide a control apparatus that makes it possible to decrease the clamping force of a variator as much as possible within a range not causing slippage of a power transmission element such as a chain.

Note that, the term "clamping force" used herein refers to the hydraulic pressure for generating the clamping force unless otherwise specified.

Although some of the embodiments of the technology are described above, the technology is not limited to the foregoing embodiments, and various modifications may be made. For example, although the foregoing embodiments are applied to a chain-driven continuously variable transmission (CVT), the foregoing embodiments may also be applied to, for example, a belt-driven continuously variable transmission (CVT) instead.

The system configuration is not limited to the foregoing embodiments. For example, although the ECU 60 that controls the engine 10 and the TCU 40 that controls the continuously variable transmission 30 are separate pieces of hardware in the foregoing embodiments, the ECU 60 and the TCU 40 may be a single integrated piece of hardware.

In at least one of the foregoing embodiments, the clamping force of the secondary pulley is corrected through the multiplication by the learning correction coefficient C. In an alternative embodiment, the clamping force of the secondary pulley may be corrected through addition of the learning correction coefficient C.

In at least one of the foregoing embodiments, the clamping force of the secondary pulley 35 is controlled in accordance with the engine torque. In an alternative embodiment, the clamping force of the primary pulley 34 may be controlled in accordance with the engine torque.

According to the foregoing embodiments of the technology, it is possible to decrease the clamping force of the variator as much as possible within a range not causing a slippage of the chain or another power transmission element.

One or more of the primary-pulley clamping force acquiring unit, the secondary-pulley clamping force acquiring unit, the input torque acquiring unit, the transmission ratio acquiring unit, the learning value acquiring unit 41, and the clamping force controller 42 in the TCU 40 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the primary-pulley clamping force acquiring unit, the secondary-pulley clamping force acquiring unit, the input torque acquiring unit, the transmission ratio acquiring unit, the learning value acquiring unit 41, and the clamping force controller 42. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the primary-pulley clamping force acquiring unit, the secondary-pulley clamping force acquiring unit, the input torque acquiring unit, the transmission ratio acquiring unit, the learning value acquiring unit 41, and the clamping force controller 42 in the TCU 40 illustrated in FIG. 1.

Although some example configurations and example processing according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

The invention claimed is:

1. A control apparatus for a continuously variable transmission, the control apparatus comprising:
a processor configured to:
acquire a clamping force of a primary pulley;
acquire a clamping force of a secondary pulley;
acquire an input torque applied to the primary pulley;
acquire a transmission ratio;
when a predetermined learning condition is satisfied, decrease the clamping force of the secondary pulley while the transmission ratio and the input torque are kept substantially constant, and to conduct learning to acquire, as a learning value, the clamping force of the secondary pulley at which a clamping force ratio of the clamping force of the primary pulley to the clamping force of the secondary pulley is maximum; and
adjust a target clamping force of the secondary pulley on a basis of the acquired learning value, the target clamping force being used to control the clamping force of the secondary pulley.

2. The control apparatus according to claim 1, further comprising
an output-shaft revolution sensor configured to detect a speed of a vehicle,
wherein the processor is configured to determine that the predetermined learning condition is satisfied on a condition that: the speed of the vehicle is a predetermined speed or greater; the speed of the vehicle is changing within a predetermined range; and the input torque is changing within a predetermined range.

3. The control apparatus according to claim 1, wherein the processor is configured to conduct the learning for each acquired transmission ratio and acquire the learning value for each transmission ratio.

4. The control apparatus according to claim 2, wherein the processor is configured to conduct the learning for each acquired transmission ratio and acquire the learning value for each transmission ratio.

5. The control apparatus according to claim 1, wherein the processor is configured to repeat the learning periodically and acquire the learning value periodically.

6. The control apparatus according to claim 2, wherein the processor is configured to repeat the learning periodically and acquire the learning value periodically.

7. The control apparatus according to claim 3, wherein the processor is configured to repeat the learning periodically and acquire the learning value periodically.

8. The control apparatus according to claim 4, wherein the processor is configured to repeat the learning periodically and acquire the learning value periodically.

9. The control apparatus according to claim 1, wherein the controller is configured to calculate the target clamping force of the secondary pulley through multiplication of a necessary clamping force by a learning correction coefficient, the necessary clamping force being set on a basis of the transmission ratio and the input torque, the learning correction coefficient being a ratio of an initial setting value of the clamping force of the secondary pulley to the learning value.

10. The control apparatus according to claim 2, wherein the controller is configured to calculate the target clamping force of the secondary pulley through multiplication of a necessary clamping force by a learning correction coefficient, the necessary clamping force being set on a basis of the transmission ratio and the input torque, the learning correction coefficient being a ratio of an initial setting value of the clamping force of the secondary pulley to the learning value.

11. The control apparatus according to claim 3, wherein the controller is configured to calculate the target clamping force of the secondary pulley through multiplication of a necessary clamping force by a learning correction coefficient, the necessary clamping force being set on a basis of the transmission ratio and the input torque, the learning correction coefficient being a ratio of an initial setting value of the clamping force of the secondary pulley to the learning value.

12. The control apparatus according to claim 4, wherein the controller is configured to calculate the target clamping force of the secondary pulley through multiplication of a necessary clamping force by a learning correction coefficient, the necessary clamping force being set on a basis of the transmission ratio and the input torque, the learning correction coefficient being a ratio of an initial setting value of the clamping force of the secondary pulley to the learning value.

13. The control apparatus according to claim 1, wherein, when a variation gradient of the clamping force ratio is negative at start of the learning, the processor is configured to increase the clamping force of the secondary pulley to a predetermined value and then decrease the clamping force of the secondary pulley after the increasing of the clamping force of the secondary pulley.

14. The control apparatus according to claim 2, wherein, when a variation gradient of the clamping force ratio is negative at start of the learning, the processor is configured to increase the clamping force of the secondary pulley to a predetermined value and then decrease the clamping force of the secondary pulley after the increasing of the clamping force of the secondary pulley.

15. The control apparatus according to claim 3, wherein, when a variation gradient of the clamping force ratio is negative at start of the learning, the processor is configured to increase the clamping force of the secondary pulley to a predetermined value and then decrease the clamping force of the secondary pulley after the increasing of the clamping force of the secondary pulley.

16. The control apparatus according to claim 4, wherein, when a variation gradient of the clamping force ratio is negative at start of the learning, the processor is configured to increase the clamping force of the secondary pulley to a predetermined value and then decrease the clamping force of the secondary pulley after the increasing of the clamping force of the secondary pulley.

17. A control apparatus for a continuously variable transmission, the control apparatus comprising
circuitry configured to
acquire a clamping force of a primary pulley,
acquire a clamping force of a secondary pulley,
acquire an input torque applied to the primary pulley,
acquire a transmission ratio,
decrease, when a predetermined learning condition is satisfied, the clamping force of the secondary pulley while the transmission ratio and the input torque are kept substantially constant, conduct learning to acquire, as a learning value, the clamping force of the secondary pulley at which a clamping force ratio of the clamping force of the primary pulley to the clamping force of the secondary pulley is maximum, and adjust a target clamping force of the secondary pulley on a basis of the acquired learning value, the target clamping force being used to control the clamping force of the secondary pulley.

* * * * *